United States Patent [19]

Sankovich

[11] 4,072,562
[45] Feb. 7, 1978

[54] DEVICE TO ACCEPT AXIAL FORCES OCCURRING ON FUEL ASSEMBLIES DURING THE OPERATION OF NUCLEAR REACTORS

[75] Inventor: Melvin F. Sankovich, Lynchburg, Va.

[73] Assignee: The Babcock & Wilcox Company, New York, N.Y.

[21] Appl. No.: 726,398

[22] Filed: Sept. 24, 1976

[30] Foreign Application Priority Data

Sept. 25, 1975 Germany .............................. 2542757

[51] Int. Cl.² .............................................. G21C 3/04
[52] U.S. Cl. ...................................... 176/50; 176/87; 176/78
[58] Field of Search ...................... 176/76, 77, 87, 85, 176/50, 78

[56] References Cited

U.S. PATENT DOCUMENTS

| 3,115,448 | 12/1963 | Hackney et al. | 176/85 |
| 3,215,608 | 11/1965 | Guenther | 176/87 |
| 3,682,774 | 8/1972 | Beyer | 176/88 |
| 3,726,761 | 4/1973 | Thorel et al. | 176/85 |
| 3,770,583 | 11/1973 | Klumb et al. | 176/76 |

Primary Examiner—Harvey E. Behrend
Attorney, Agent, or Firm—J. M. Maguire; J. P. Sinnott

[57] ABSTRACT

The invention pertains to a device for accepting axial forces generated during the operation of a nuclear reactor by the flow of the cooling medium and the thermal expansion of the fuel assemblies consisting of rod-shaped fuel rods while the fuel assemblies are resting on a lower grid plate and at the upper end are elastically supported against an upper grid plate.

3 Claims, 11 Drawing Figures

FIG. 9
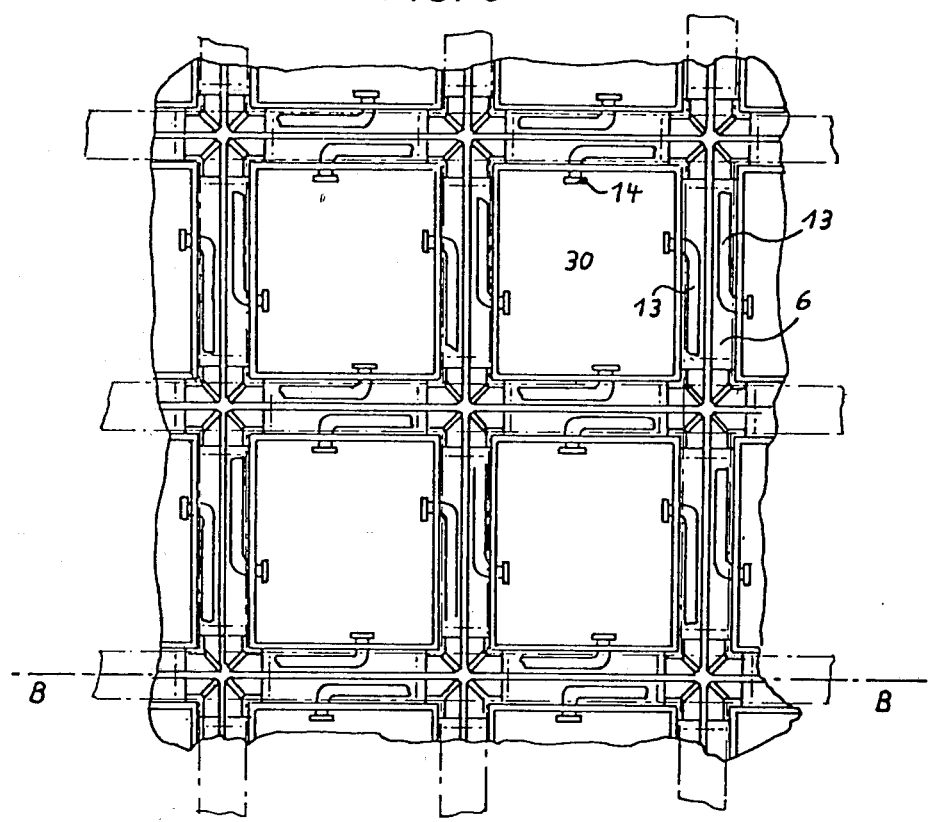
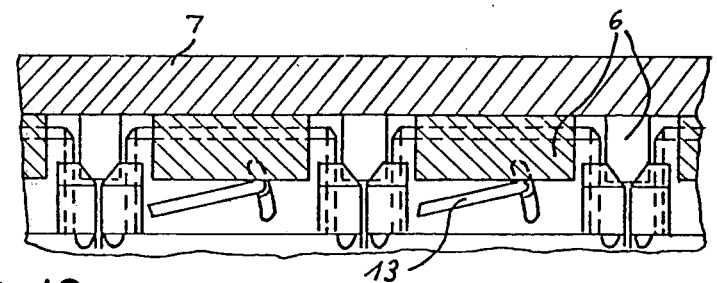
FIG. 10
FIG. 11
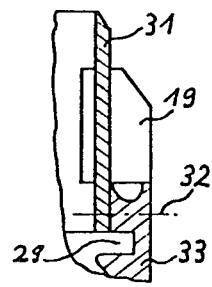

DEVICE TO ACCEPT AXIAL FORCES OCCURRING ON FUEL ASSEMBLIES DURING THE OPERATION OF NUCLEAR REACTORS

BACKGROUND OF THE INVENTION

1. FIELD OF THE INVENTION

This invention relates to fuel elements for nuclear reactor cores and, more specifically, to apparatus for restraing fuel element motion during reactor operation, and the like.

2. BACKGROUND

Normally, the fuel assemblies are densely spaced and the coolant medium, which can be a liquid or gas, flows vertically upward in longitudinal direction. The flow can stress the fuel assemblies or the fuel rods, so that vibrations are induced. Due to variation in the coefficients of heat expansion of the various materials used in nuclear constructions, it is not possible to rigidly attach the fuel assemblies to the lower and the upper grid plates which are integral parts of the core support structure. Therefore, it was already suggested (OS 21 40 170) to provide elastic (spring) elements to press the fuel assemblies against the two grid plates. Such arrangement has the disadvantage that the elastic element with its compression spring is located in the flow path which causes an undesirable pressure drop, which on large reactors may attain considerable values. The inlet pressure of the coolant must be increased which is equivalent to a reduction of reactor efficiency.

The purpose of the invention is to support the fuel assemblies simply, safely, free of vibration and without an increase of the flow resistance of the coolant.

The various features of novelty which characterize the invention are pointed out with particularity in the claims annexed to and forming a part of this specification. For a better understanding of the invention, its operating advantages ans specific objects attained by its use, reference should be had to the accompanying drawing and descriptive matter in which there is illustrated and described a preferred embodiment of the invention.

BRIEF DESCRIPTION OF THE DRAWING

FIG. 9, is a partial view in the direction of arrow "B" in FIG. 1;

FIG. 10, is a section along line B-B of FIG. 9; and

FIG. 11, shows a special design of the fuel assembly end fitting in a section along line C-C of FIG. 6.

DETAILED DESCRIPTION OF THE PREFERRED EMBODIMENTS

Figure 1:
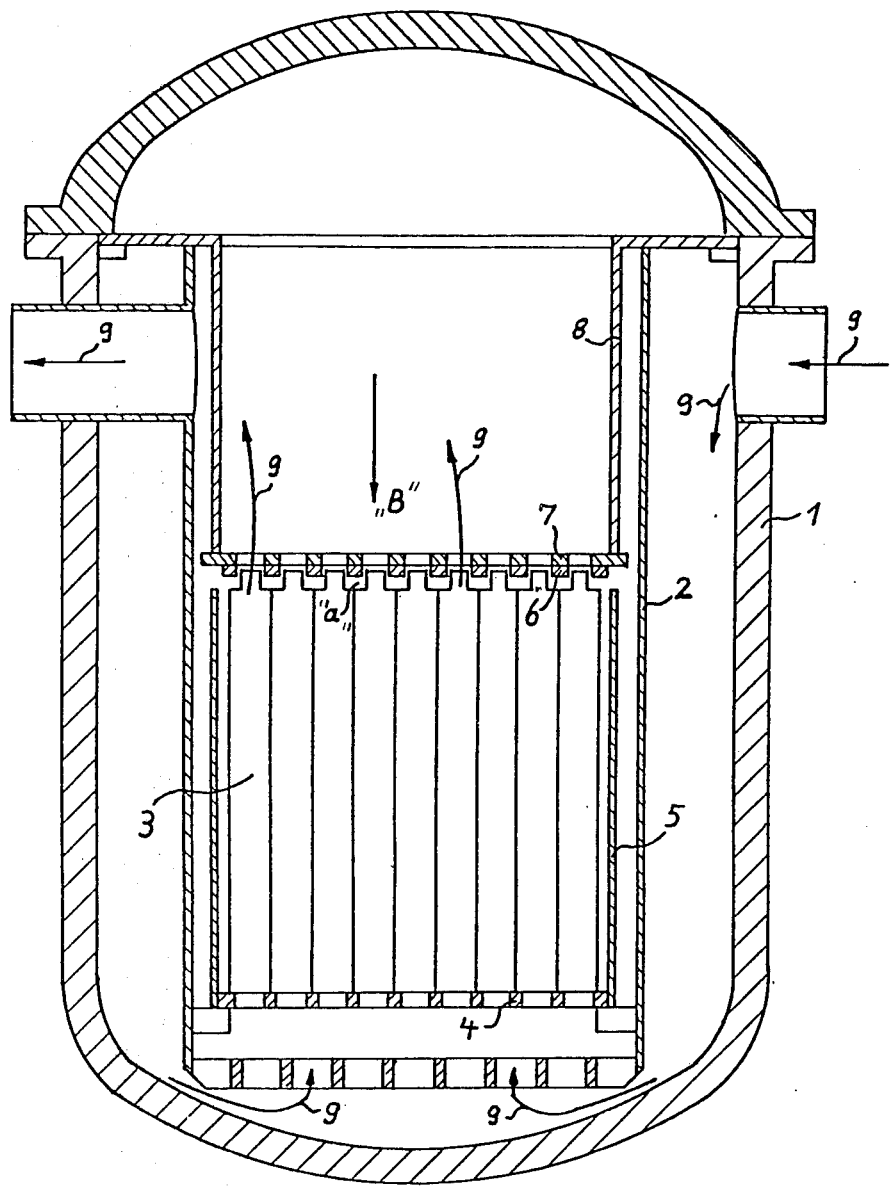
FIG. 1, shows an axial section through a reactor vessel.
Figure 6:
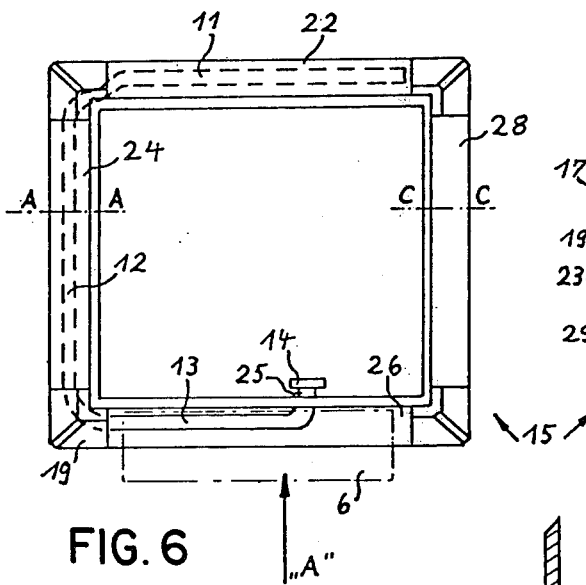
FIG. 6, shows a top view of a fuel assembly with the spring of FIG. 2 arranged according to the invention.
Figure 7:
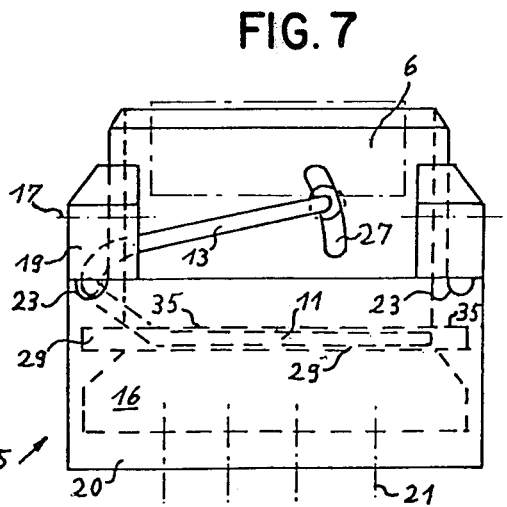
FIG. 7, shows a view in the direction of arrow "A" on FIG. 6.
Figure 8:
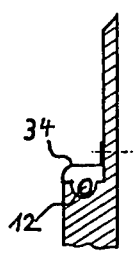
FIG. 8, shows a section along line A-A of FIG. 6.

FIG. 1 shows schematically an axial section of a reactor vessel 1. The fuel assemblies 3 which consist of rod shaped fuel rods are arranged inside of the core support structure denoted by 2. The fuel assemblies 3 which form the reactor core rest on the bottom grid plate 4 and are surrounded by a shroud 5. To compensate for the thermal expansion and mechanical vibrations occurring during the reactor operation, the fuel assemblies are elastically or resiliently supported against compression protrusions or upper grid pads 6 that are provided in the upper grid plate 7 which is suspended from a support cylinder 8. Combination bending and torsion springs, whose design and arrangement are fully described in connection with FIGS. 2 - 11, are used to bridge over the distance "a" between the compression protrusions 6 and the fuel assembly upper end fitting 15 (FIGS. 6 and 7). The arrows 9 (FIG. 1) symbolize the flow direction of the coolant which flows through the reactor from the bottom upwards.

Figure 2:
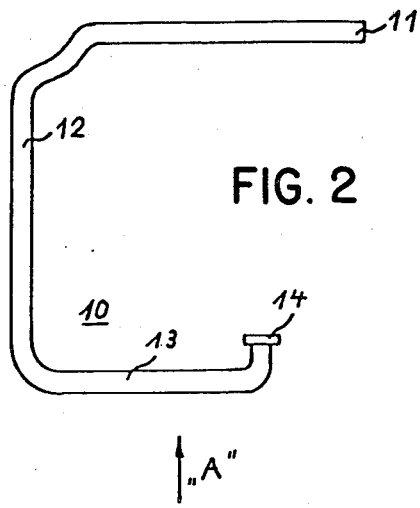
FIGS. 2-5, show designs of the spring according to the invention.

The combined bending and torsion spring 10 shown in plan view on FIG. 2 consists of a bending arm 11, a torsion part 12 and a second bending arm 13 which at the end is bent at 90° and is provided at that end with a large upsetting 14.

Figure 3:
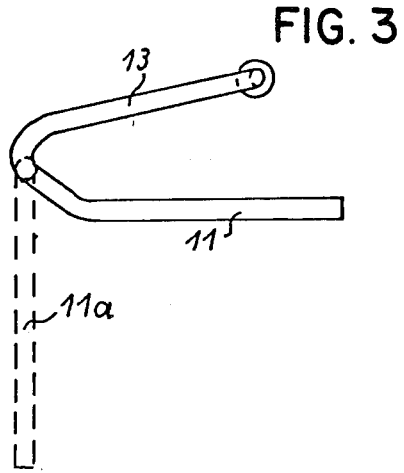
Figure 4:
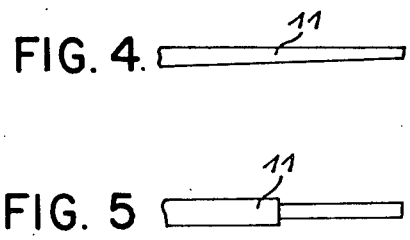
Figure 5:
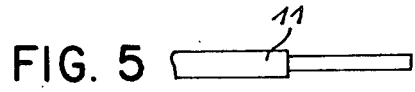

From FIG. 3, which is a view in the direction of the arrow "A" in FIG. 2, it can be seen that the bending arm 13 is tilted upwards. The bending arm 11 can be bent for example as shown by the dash lines 11a depending on the particular application conditions of the spring. The bending arm can be made conical (FIG. 4) or stepped (FIG. 5) to increase the flexibility. The spring 10 consists of a round bar but could also be made of flat or square material or of a combination of shapes.

The end fitting 15 of the fuel assembly depicted in FIGS. 6 and 7 consists of the main body 16 and four compression pieces 19 attached to it by bolts 17. In the tube sheet 20 which is part of the main body 16 there are provided holes 21 for guide tubes of the control rods. A spring according to FIG. 2 is imbedded with the bending arm 11 resting in the groove 29 of the main body wall 22 and the torsion part 12 held in a groove 23 of the wall 24. The second bending arm 13 is free and is only guided by its bent end 25 in the slot 27 provided in the wall 26. The bending arm 13 presses against a protrusion or upper grid pad 6 (shown in dash and dotted line) of the upper grid plate 7 (FIG. 1). At least one compression piece 19 serves to clamp the torsion part 12 of the spring. The bending arm 11 is held in position by the surface 35 of the groove 29. The torsion part 12 of the spring 10 between the compression pieces 19 is covered by guard plate 34 (in FIG. 8). The guard plate is provided for safety to insure that in case of a spring failure, no broken pieces will enter into the coolant flow circuit. The upset end 14 together with the guide slot 27 serve the same purpose. Only one combined bending and torsion spring is depicted in order to insure clarity. Normally, each end fitting of a fuel assembly will be provided with four springs 10. Similarly as shown in the wall 22, a bending arm 11 is present in the walls 24, 26 and 28. A torsion part 12 with a guard plate 34, as shown in the wall 24 is also present in the walls 26, 28 and 22. A slot 27 for guiding the bending arm 13 as shown on wall 26 is also present in walls 28, 22 and 24. The springs 10 are bent so that mutual interference is not possible.

The advantage of the invention can be clearly seen on FIG. 9 and 10. In the flow region 30 the springs used to compensate for thermal expansion do not present an obstruction to the flow of coolant except for the insignificant upsets 14. In FIGS. 9 and 10, for clarity reasons, only the bending arms 13 are shown, which rest on the protrusions 6 of the upper gird plate shown in dash and dot lines. One protrusion 6 engages always two bending arms 13 which belong to two adjoining fuel assemblies. FIG. 11 shows a section along line C—C of FIG. 6 depicting a special embodiment of the compression piece 19 which serves to clamp the torsion part 12 of the combined bending and torsion spring 10. The main body 16 is made of two parts. The upper part 31 (FIG. 11) and the four compression pieces 19 form one part. The upper part 31 is connected to the low part 33 with bolts 32.

The application of the inventive resilient support has created a device which is capable to safely accept the axial forces generated during the operation of a nuclear reactor by the flow of the coolant and the thermal expansion of the fuel assemblies without retarding the flow of the coolant.

Further advantages are:

The combined bending and torsion springs are a good substitute for compression springs because they too are capable to accept large axial forces along a large distance.

Vibration of the support springs, which is a serious problem on compression springs, does not occur with combined bending and torsion springs.

There is a better access for repairs to the screwed connections of the fuel assembly end-fittings with the guide tubes of the control rods.

The springs can be installed in the end-fittings in the shop.

The embodiments of the invention in which an exclusive property of privilege is claimed are defined as follows:

1. In a nuclear reactor having upper and lower grid plates, protrusions projecting from the upper grid plate, and fuel assemblies with end fittings, wherein the fuel assemblies are positioned between the upper and lower grid plates, an improved arrangement for accepting axial forces comprising: a plurality of spring devices, each having a first bending arm, a torsion part, a second bending arm and an upset end; said torsion part fixed at one end to said first bending arm and at its other end to said second bending arm, and said second bending arm terminating in said upset end; each end fitting having a main body, a plurality of compression pieces, and guard plates; said main body having a plurality of grooves of a first type, a plurality of grooves of a second type, and a plurality of slots; each of said spring devices being disposed relative to the end fitting such that said first bending arm is embedded within a groove of said first type, said torsion part rests within a groove of said second type covered partly by one of said guard plates and clamped at its uncovered part by at least one of said compression pieces, said upset end extending through one of said slots; the fuel assembly being disposed such that said second bending arm is biased against the protrusion of the upper grid plate.

2. An improved arrangement for accepting axial forces according to claim 1 in which said first bending arm is conical.

3. An improved arrangement for accepting axial forces according to claim 1 in which said first bending arm is stepped.

* * * * *